(12) United States Patent
Ishikawa et al.

(10) Patent No.: US 6,356,361 B1
(45) Date of Patent: Mar. 12, 2002

(54) IMAGE PROCESSING APPARATUS AND METHOD FOR PROCESSING GRADATION IMAGE DATA USING ERROR DIFFUSION

(75) Inventors: Atsushi Ishikawa, Okazaki; Kenichi Sawada, Toyohashi, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/178,452

(22) Filed: Oct. 23, 1998

(30) Foreign Application Priority Data

Oct. 30, 1997 (JP) .............................. 9-298738

(51) Int. Cl.[7] ................................ G06K 9/38
(52) U.S. Cl. ......................... 358/1.9; 382/252
(58) Field of Search ................ 358/1.9, 455–456, 358/465; 382/251–253, 237

(56) References Cited

U.S. PATENT DOCUMENTS 5,479,538 A  * 12/1995  Takahashi .................... 382/270
5,488,673 A  * 1/1996  Katayama et al. ............ 382/270
5,495,542 A  * 2/1996  Shimomura et al. ......... 382/254
5,515,456 A  * 5/1996  Ballard ......................... 382/252
5,905,816 A  * 5/1999  Shimazaki ..................... 382/254

FOREIGN PATENT DOCUMENTS

JP            6-098157        4/1994

* cited by examiner

*Primary Examiner*—Thomas D. Lee
*Assistant Examiner*—Stephen Brinich
(74) *Attorney, Agent, or Firm*—Sidley Austin Brown & Wood (57) ABSTRACT

An image processing apparatus that can speed the process without degrading the resolution and gradation of the original error diffusion method includes a product sum calculation unit for calculating a weighted mean error $E'ave_{xy}$ leaving out the binarization error of an input pixel $I_{x-1,y}$, an adder for adding the calculated result of the product sum calculation unit to $I_{xy}$ to output $I''_{xy}$, a multiplier 25 for calculating a diffusion error $E'_{x-1,y}$ from the binarization error $E_{x-1,y}$ of $I_{x-1,y}$ to be error-diffused to $I_{xy}$, and a comparator for setting the output pixel $B_{xy}$ to 1 when $E'_{x-1,y} \geq Th - I''_{xy}$ is established and to 0 when not established.

7 Claims, 5 Drawing Sheets

IMAGE PROCESSING APPARATUS AND METHOD FOR PROCESSING GRADATION IMAGE DATA USING ERROR DIFFUSION

This application is based on Japanese Patent Application No. 9-298738 filed in Japan, the content of which is hereby incorporated by reference.

BACKGROUND OF THE INVENTION

1. Field of the Invention

The present invention relates to an image processing apparatus and an image processing method. More particularly, the present invention relates to an apparatus and method for processing M gradation image data of a target pixel to obtain N gradation image data of the target pixel by using an error diffusion method, where N is less than M.

2. Description of the Related Art

An image processing apparatus that allows an input multi-value gradation level image to be reproduced in a binary gradation level image using an error diffusion method is known. The error diffusion method used in such types of image processing apparatuses diffuses the difference between the density of a target pixel of a read out image and the display density (binarization error) to predetermined peripheral pixels using a predetermined error diffusion matrix. In other words, binarization error of a predetermined neighborhood pixel is diffused to the density of a target pixel at a predetermined rate and then weight applied to calculate the display density. The error diffusion method will be described hereinafter.

Figure 5:
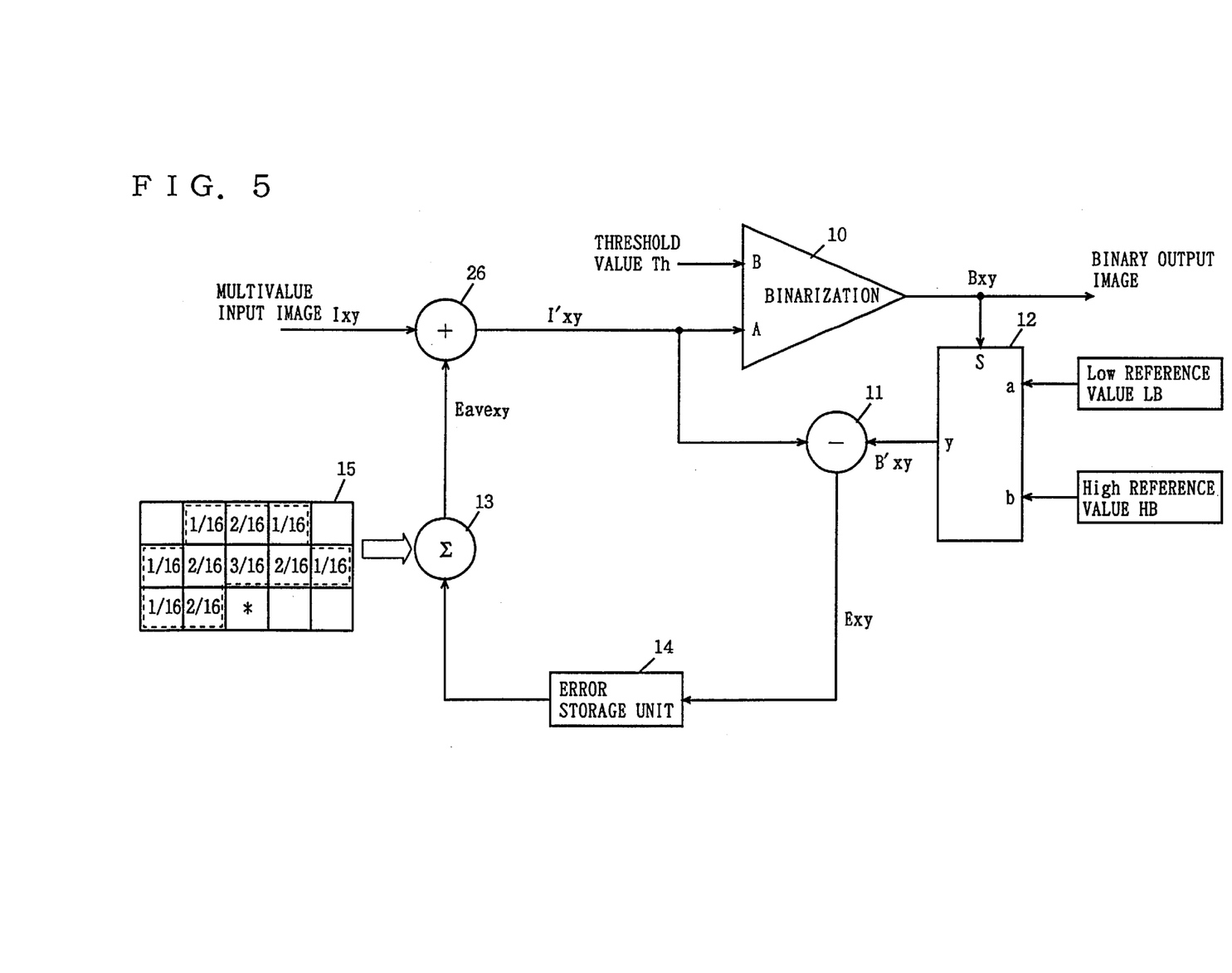
FIG. 5. is a block diagram showing a related error diffusion method.

FIG. 5 is a block diagram showing a related error diffusion method. When the density data of each pixel forming a multivalue gradation level input image is:

$$I_{xy}\ (0 \leq I_{xy} \leq 1),$$

and the density data of each pixel forming a binarized image output corresponding to $I_{xy}$ is:

$$B_{xy}\ (B_{xy}=0\ \text{or}\ 1),$$

then the binarization error $E_{xy}$ is calculated by the following equation (1) if correction by the weighted mean error $Eave_{xy}$ that will be described afterwards is not taken into account.

$$E_{xy}=I_{xy}-B_{xy} \quad (1)$$

In the error diffusion method, the binarization error is averaged to become smaller by diffusing the binarization error to the peripheral pixels. FIG. 5 shows an error weighting filter 15 employed in diffusing the binarization error of a neighborhood pixel to the target pixel to be processed. In this figure, "*" designates the pixel of interest to be processed (particularly called target pixel). With respect to pixel data $I_{xy}$ of this target pixel, binarization error $E_{xy}$ of each of the peripheral pixels that are already processed and located within the dotted line in error weighting filter 15 is error-diffused by respective weighting coefficients (1/16, 2/16, 3/16 shown in FIG. 5) to correct the density data of target pixel $I_{xy}$. Therefore, in practice, binarization error $E_{xy}$ of the previous equation (1) is calculated on the basis of data $I'_{xy}$ which is a corrected version of target pixel data $I_{xy}$. It is appreciated from FIG. 5 that an error feedback loop is formed for error diffusion. When the data correction value of target pixel data $I_{xy}$ is $Eave_{xy}$, corrected data $I'_{xy}$ is calculated by the following equation (2).

$$I'_{xy}=I_{xy}+Eave_{xy} \quad (2)$$

Here, correction value $Eave_{xy}$ is the weighted mean error with respect to the input target pixel data $I_{xy}$, and is calculated by the following equation (3) where $k_{i,j}$ is the weighting coefficient of error weighting filter 15. Here, i is the matrix size in the main scanning direction, for example i=5, and j is the matrix size in the subscanning direction, for example j=3.

$$Eave_{xy}=\Sigma(K_{i,j} \times E_{i,j}) \quad (3)$$

In FIG. 5, "26" designates an adder that adds the density data of the target pixel with the weighted mean error $Eave_{xy}$ of the peripheral error. Adder 26 outputs corrected data $I'_{xy}$ according to equation (2) to a comparator 10 for binarization and to a subtractor 11 for binarization error calculation.

Comparator 10 compares corrected data $I'_{xy}$ obtained by equation (2) with a predetermined threshold value Th. Binarization is carried out according to the result of the comparison. Thus, density data $B_{xy}$ of the pixel forming a binarization image is defined as shown in the following equation (4).

$$B_{xy}=1\ (I'_{xy} \geq Th)\ \text{or}\ 0\ (I'_{xy} < Th) \quad (4)$$

The result of comparator 10 is also applied to a selector 12. Selector 12 selects a reference value $B'_{xy}$ that is used in calculating binarization error $E_{xy}$ as in the following equation (5) according to the result from comparator 10. The selected value is provided to subtractor 11.

$$B'_{xy}=HB\ (B_{xy}=1)\ \text{or}\ LB\ (B_{xy}=0) \quad (5)$$

In the above equation (5), HB (High reference value) and LB (Low reference value) are applied corresponding to the upper limit value and the lower limit value of the dynamic range of the output pixel density. For example, HB=1 and LB=0.

In subtractor 11, binarization error $E_{xy}$ is calculated by the following equation (6) with respect to the previous equation (1).

$$E_{xy}=I'_{xy}-B'_{xy} \quad (6)$$

The calculated result of subtractor 11 is stored in an error storage unit 14. The stored data is output to a product sum calculation unit 13 at every input of $I_{xy}$ to adder 26. Product sum calculation unit 13 sequentially reads out binarization error $E_{i,j}$ stored in error storage unit 14 according to input data $I_{xy}$ to multiply a weighting coefficient $K_{i,j}$ by binarization error $E_{i,j}$ to calculate weighted mean error $Eave_{xy}$. The result is provided to adder 26.

The above-described error diffusion method is characterized in its high resolution and gradation. However, weighted mean error $Eave_{xy}$ to be added to one target pixel (the current target pixel) can be calculated only after calculation of binarization error $E_{xy}$ of a pixel immediately preceding the current target pixel (one previous pixel) is completed. Calculation for the current target pixel can be initiated at adder 26 only after the input of the current target pixel and weighted mean error $Eave_{xy}$ of the immediately preceding pixel. Therefore, improvement in the processing speed is desired.

SUMMARY OF THE INVENTION

In the present invention, attention is focused on the issue that increase in the processing speed is attributed to the fact that the error feedback loop in FIG. 5 is related to one whole pixel cycle corresponding to the process of one target pixel. An object of the present invention is to provide an image processing apparatus and an image processing method that allows increase in the processing speed without degrading the essential resolution and gradation of the error diffusion method.

According to an aspect of the present invention, an image processing apparatus which processes M gradation image data of a target pixel to obtain N gradation image data of the target pixel (N is less than M) by using an error diffusion method, includes: a first calculator which calculates a first error to be added to the M gradation image data of the target pixel from peripheral pixels of the target pixel, a pixel which is immediately preceding the target pixel being excluded from the peripheral pixels; and an adder which adds the first error calculated by the first calculator to the M gradation image data of the target pixel.

According to another aspect of the present invention, an image processing method for processing M gradation image data of a target pixel to obtain N gradation image data of the target pixel by using an error diffusion method, where N is less than M, includes the steps of: calculating a first error which is to be added to the M gradation image data of the target pixel from peripheral pixels of the target pixel, a pixel which is immediately preceding said target pixel being excluded from the peripheral pixels; and adding the first error to the M gradation image data of the target pixel.

According to the present invention, the N-value gradation reproduction process of a target pixel can be initiated prior to completion of the process of at least an immediately preceding pixel. Therefore, the process can be speeded.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image processing apparatus according to a first embodiment of the present invention will be described hereinafter with reference to the drawings.

Figure 1:
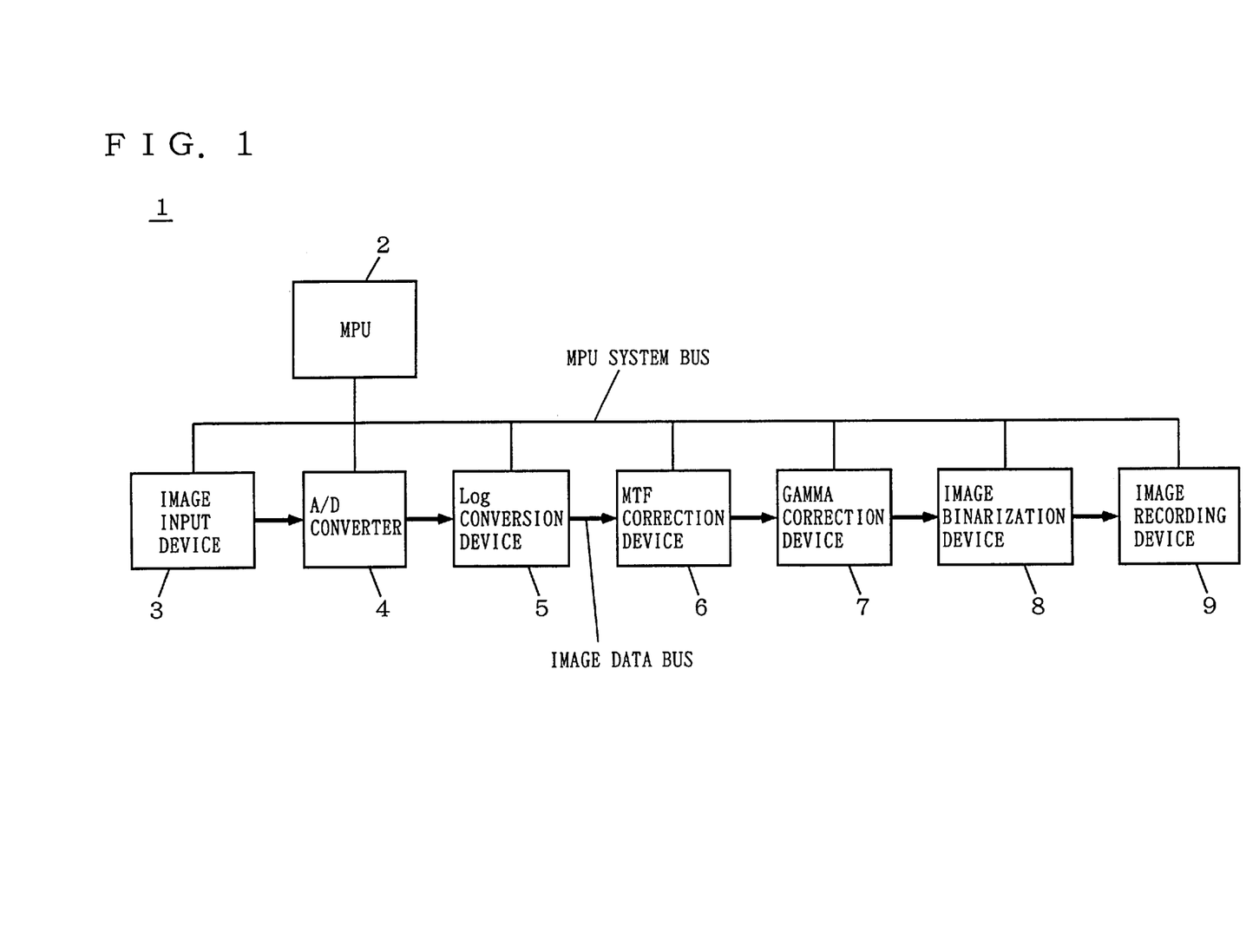
FIG. 1 is a block diagram for describing a structure and process of an image processing apparatus 1.

Referring to FIG. 1, an image processing apparatus 1 includes a MPU2, an image input device 3 formed of a photoelectric conversion element such as CCD and a drive system, an A/D converter 4, a Log conversion device 5, a sharpness correction device (MTF correction device) 6, a gamma correction device 7, an image binarization device 8, and an image recording device 9.

Image input device 3 reads out an original document such as a continuous tone image, or a line copy to generate a sampling analog signal. A/D converter 4 quantizes the sampling analog signal generated at image input device 3 as continuous tone reflectance data with a value of, for example, 8 bits (256 gray levels) for one pixel. Log conversion device 5 converts on a logarithmic scale the quantitized continuous tone reflectance data into 8-bit continuous tone density data. Sharpness correction device (MTF correction device) 6 uses a digital filter such as a Laplacian filter to correct the sharpness of the 8-bit continuous tone density data image. Gamma correction device 7 carries out gamma correction to correct the difference between the gradation curve of input image device 3 and image recording device 9 to obtain a desirable gamma property for image processing apparatus 1. Gamma correction is carried out by having non-linear gamma correction data set by MPU2 using a RAM serving as a LUT (Look Up Table) of approximately 256 words and 8 bits, for example. Image binarization device 8 employs the error diffusion binarization method that will be described afterwards to convert the gamma-corrected 8-bit continuous tone density data into binary data of 1 bit according to the brightness/darkness. The converted 1-bit binary data is printed out on a predetermined recording medium by image recording device 9 such as an electro-photographic printer or ink jet printer.

The error diffusion binarization process carried out by image processing apparatus 1 will be described hereinafter with reference to FIG. 2. For the sake of simplification, the "error diffusion binarization process" is referred to as "binarization process" hereinafter.

Figure 2:
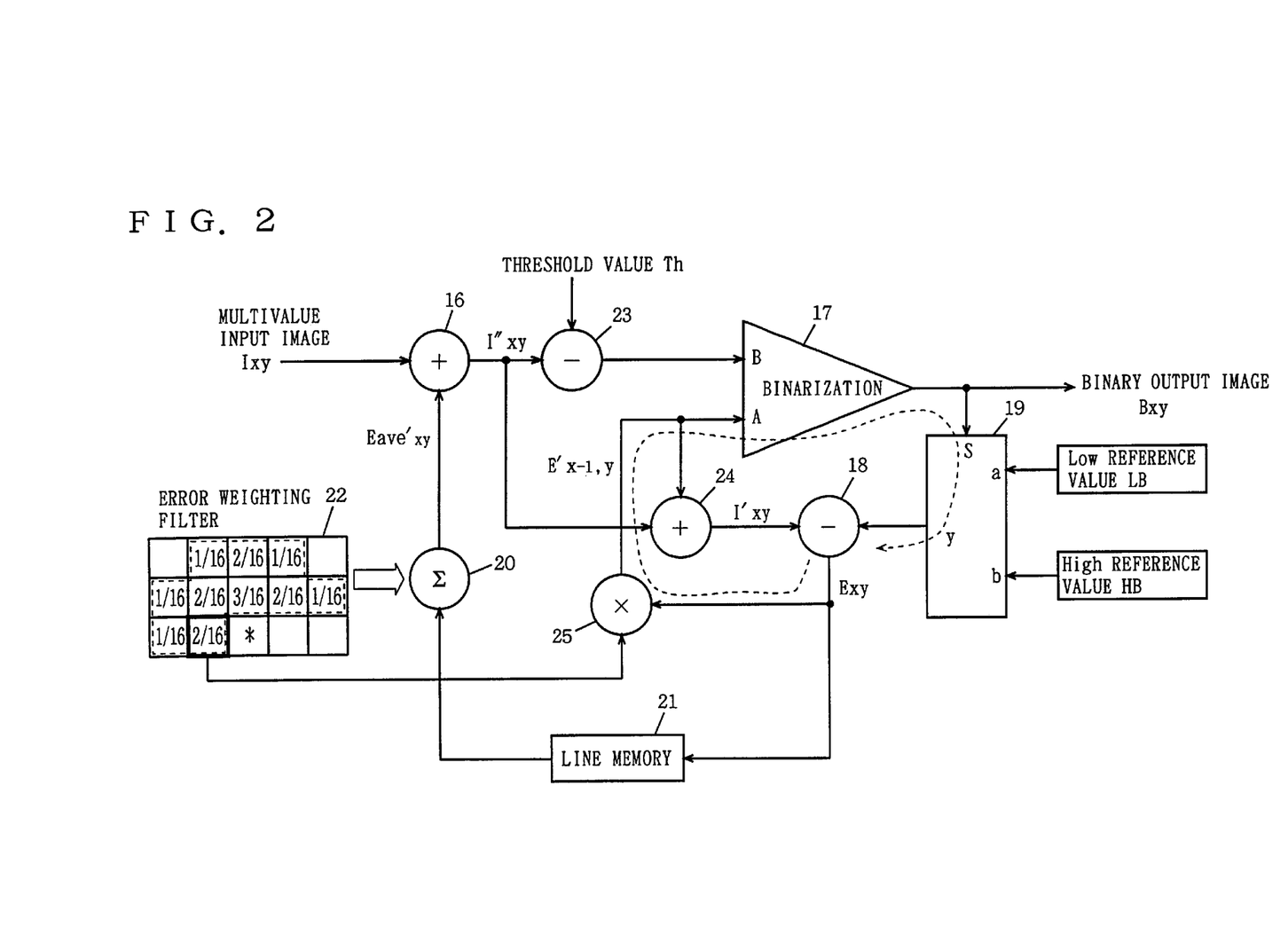
FIG. 2 is a block diagram for describing the contents of an error diffusion binarization process executed by image processing apparatus 1.

Referring to FIG. 2, image processing apparatus 1 includes a product sum calculation unit 20 for calculating weighted mean error Eave'$_{xy}$, an adder 16 adding the target density of target pixel data I$_{xy}$ of a multivalue gradation level to weighted mean error Eave'$_{xy}$ to provide the added result I"$_{xy}$ to a subtractor 23 and an adder 24, a subtractor 23 subtracting added result I"$_{xy}$ of adder 16 from a predetermined value Th to output the subtracted result to a comparator 17, a multiplier 25 calculating diffusion error E'$_{x-1, y}$ from binarization error E$_{x-1, y}$ of target pixel data I$_{x-1, y}$ (one previous pixel) that is input right before the process of I$_{xy}$ for error diffusion to I$_{xy}$ and providing the calculated result to comparator 17 and adder 24, comparator 17 for comparing E'$_{x-1, y}$ output from multiplier 25 with Th−I"$_{xy}$ output from subtractor 23 to output binarization output pixel data B$_{xy}$, a selector 19 calculating a reference value B'$_{xy}$ used in binarization error calculation from B$_{xy}$ of comparator 17 and a reference value (high reference value HB or low reference value LB) to output the calculated result to a subtractor 18, adder 24 adding the outputs of adder 16 and multiplier 25 to obtain corrected data I'$_{xy}$ and providing the calculated result to subtractor 18, subtractor 18 calculating binarization error E$_{xy}$ from I'$_{xy}$ output from adder 24 and the reference value output from selector 19 to provide the calculated result to a line memory 21, and line memory 21 storing binarization error E$_{xy}$ output from subtractor 18 for every scanning line, and providing binarization error E$_{xy}$, if necessary, to product sum calculation unit 20.

The difference over the related art described with reference to FIG. 5 is that weighted mean error Eave$_{xy}$ added with respect to the input target pixel data I$_{xy}$ is calculated with binarization error E'$_{x-1, y}$ of one immediately preceding pixel data I$_{x-1, y}$ left out. Therefore, the process of the incoming target pixel data I$_{xy}$ can be initiated without waiting for the calculation of binarization error E$_{x-1, y}$ of previous target pixel data I$_{x-1, y}$.

Figure 3:
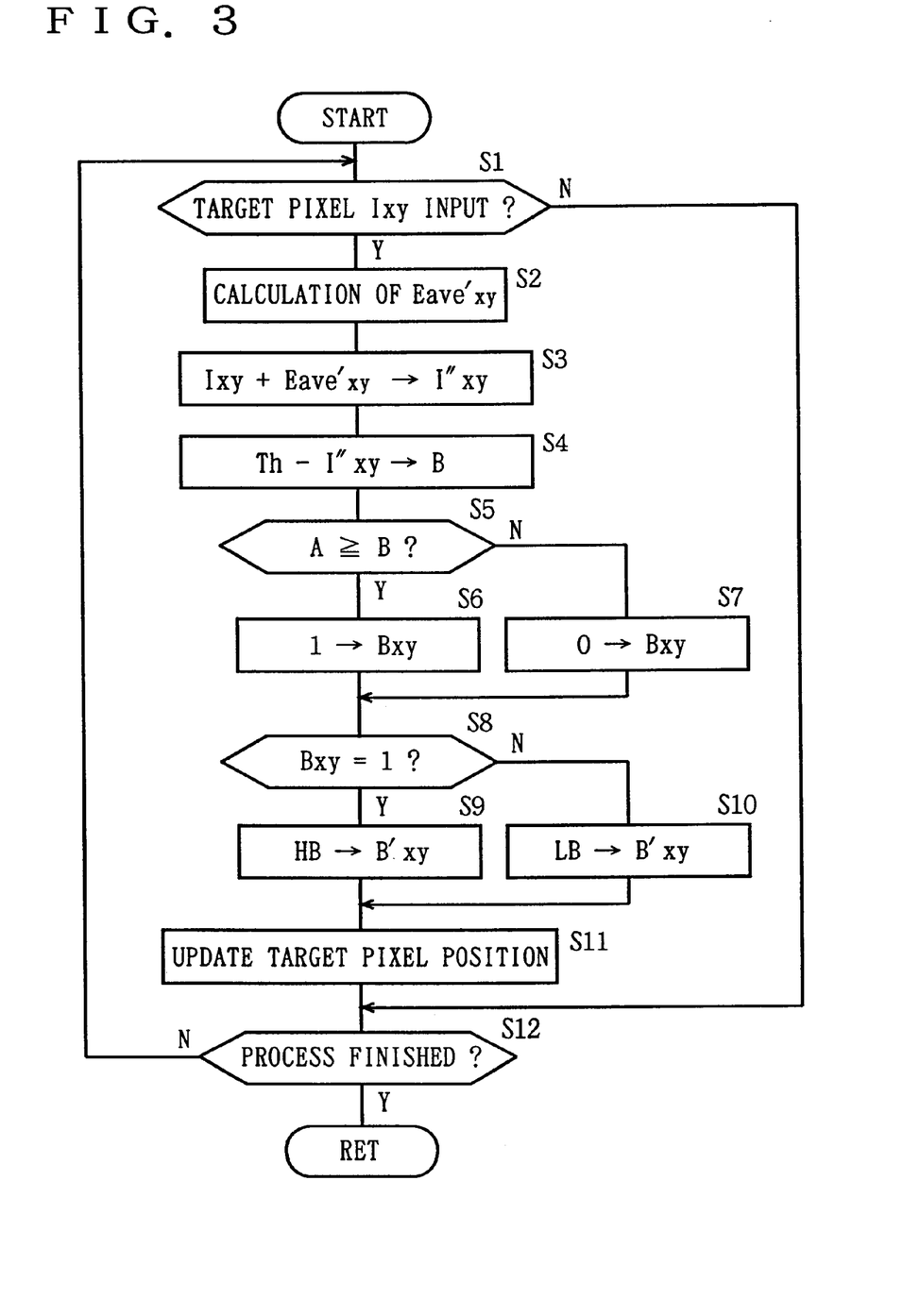
FIGS. 3 and 4 are flow charts for describing the contents of the error diffusion binarization process executed by image processing apparatus 1.
Figure 4:
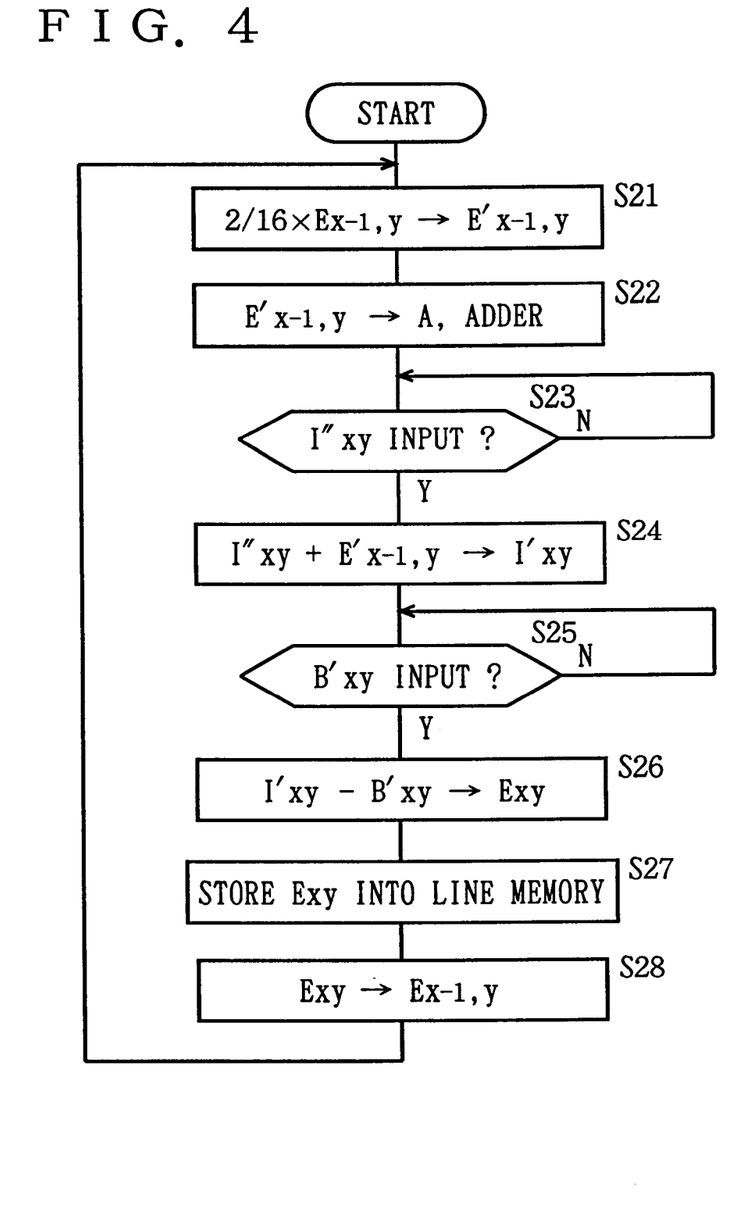

The details of the process of FIG. 2 will be described with reference to the flow charts of FIGS. 3 and 4. Referring to FIG. 3, determination is made whether target pixel data I$_{xy}$ is input to adder 16 or not (S1). Target pixel data I$_{xy}$ is one of the pixels that form the aforementioned gamma-corrected 8 bit continuous tone density data, and is the density data of the pixel that is subject to binarization.

When no target pixel is input, determination is made whether the process has ended or not, i.e., whether the binarization process is completed for all the pixels in the multivalue gradation input image (S12).

Control returns to S1 unless the binarization process has been completed for all the pixels.

When a target pixel is input, weighted mean error $Eave'_{xy}$ to be added to the density data of the current target pixel is calculated (S2). This weighted mean error $Eave'_{xy}$ is calculated without the binarization error $E_{x-1, y}$ of one immediately preceding pixel data $I_{x-1, y}$. More specifically, the one immediately preceding pixel of $I_{x-1, y}$ is located to the left of the position (*) of target pixel $I_{xy}$ shown in error weighting filter 22 of FIG. 2. Diffusion error $E'_{x-1, y}$ of $I_{x-1, y}$ that is error-diffused to $I_{xy}$ and calculated by the following equation (7) from binarization error $E_{x-1, y}$ is not included in weighted mean error $Eave'_{xy}$.

$$E'_{x-1, y} = 2/16 \times X_{x-1, y} \qquad (7)$$

Then, in adder 16, weighted mean error $Eave'_{xy}$ is added to $I_{xy}$ to become $I''_{xy}$. This calculated $I''_{xy}$ is output to subtractor 23 and adder 24 (S3).

$$I''_{xy} = I_{xy} + Eave'_{xy} \qquad (8)$$

Since diffusion error $E'_{x-1, y}$ is not included in weighted mean error $Eave'_{xy}$, adder 16 can immediately initiate an adding process if the next target pixel data $I_{xy}$ is input regardless of whether binarization error $E_{x-1, y}$ of the previously input $I_{x-1, y}$ is calculated or not.

In subtractor 23, $I''_{xy}$ is subtracted from a predetermined threshold value Th to be output to a port B of comparator 17 (S4). In comparator 17, the data input to a port A is compared with the data input to port B (S5). Diffusion error $E'_{x-1, y}$ that is error-diffused to $I_{xy}$ and obtained from binarization error $E_{x-1, y}$ of one immediately preceding pixel $I_{x-1, y}$ is applied to port A of comparator 17, as will be described afterwards with reference to FIG. 4. Comparator 17 compares data $E'_{x-1, y}$ input at port A with data Th$-I''_{xy}$ input at port B to set density data $B_{xy}$ of the pixel that forms the binarization image to 1 when the following relationship of (9) is satisfied (S6), and to 0 when relationship (9) is not established (S7).

$$E'_{x-1, y} \geq Th - I''_{xy} \qquad (9)$$

Description is provided hereinafter that B, defined by the process of S5–S7 is based on a condition identical to that of the previous equation (4).

First, inserting equation (8) into equation (9) results in:

$$E'_{x-1, y} \geq Th - (I_{xy} + Eave'_{xy})$$

A modification thereof is:

$$(I_{xy} + Eave'_{xy}) + E'_{x-1, y} \geq Th$$

Since $Eave'_{xy} + E'_{x-1, y}$ is equal to $Eave_{xy}$ indicated in equation (2), the above equation (9) can be modified as:

$$I_{xy} + Eave_{xy} \geq Th \qquad (9)'$$

Furthermore, by inserting $I_{xy} + Eave_{xy} = I'_{xy}$ of the previous equation (2) into the above equation (9)', the following is obtained.

$$I'_{xy} \geq Th \qquad (9)''$$

By the above equation (9)" and by S9 and S10, $B_{xy}$ will be defined according to the following equation (10). This condition is identical to the condition of equation (4).

$$B_{xy} = 1 \ (I'_{xy} \geq Th) \text{ or } 0 \ (I'_{xy} < Th) \qquad (10)$$

$B_{xy}$ set according to the above-described procedure is output to image recording device 9 (refer to FIG. 1) and to selector 19.

Then, determination is made whether $B_{xy}$ set at S6 or S7 is 1 or not (S8). When $B_{xy}$ is 1, high reference value HB is selected by selector 19. HB is output to subtractor 18 as reference value $B'_{xy}$ (S9). When $B_{xy}$ is not 1, i.e., $B_{xy}=0$, low reference value LB is selected by selector 19 to be output to subtractor 18 as reference value $B'_{xy}$ (S10).

Then, the position of the target pixel is updated (S11). When the binarization process has not ended for all the pixels, control returns to S1 (S12) to repeat the above-described process.

The contents of the process will be described with reference to FIG. 4 now. At multiplier 25, diffusion error $E'_{x-1, y}$ is calculated from binarization error $E_{x-1, y}$ of one preceding pixel $I_{x-1, y}$ to be diffused to $I_{xy}$ (S21). The calculated diffusion error $E'_{x-1, y}$ is output to port A of comparator 17 and to adder 24 (S22). Accordingly, the comparison process of S5 can be carried out at comparator 17.

At adder 24, the input of $I''_{xy}$ from adder 16 (S23) is added with $E'_{x-1, y}$ to be output as $I'_{xy}$ that is applied weight by error weighting filter 22. $I'_{xy}$ is provided to subtractor 18 (S24).

At subtractor 18, upon input of $B'_{xy}$ from selector 19 by S9 or S10 (S25), $B'_{xy}$ is subtracted from $I'_{xy}$ to obtain binarization error $E_{xy}$ which is output to line memory 21 (S26). The output binarization error $E_{xy}$ is stored in line memory 21 (S27). The previous $E_{xy}$ is replaced with $E_{x-1, y}$ (S28). The process of S21 and et seq. is repeated to process the next input target pixel data $I_{xy}$.

According to the present embodiment, the process of the next target pixel data $I_{xy}$ can be initiated without having to wait for binarization error $E_{x-1, y}$ of target pixel data $I_{x-1, y}$ to be calculated. Therefore, the process can be faster than the process according to the related art of FIG. 5. Since the high speed process of the present embodiment is implemented so that the error feedback loop indicated by the broken line in FIG. 2 is not related to the entire cycle of one pixel, the essential resolution and gradation of the error diffusion method will not be degraded.

In the related art of FIG. 5, the circuitry is formed in fidelity according to the sequence of the principle of the error diffusion method. Therefore, even an operation that can be carried out beforehand had to be carried out in the error feedback loop together with the operation that must be carried out in the one pixel cycle (error feedback amount associated with $E_{x-1, y}$), requiring a longer time for the entire binarization process. It was therefore difficult to correspond to a high speed pixel cycle. However, in the present embodiment, a high speed pixel cycle can be accommodated by comparing the operation result to be processed in one pixel cycle with the calculation result that can be processed in advance.

The present embodiment has the error diffusion process realized using a hardware structure. However, the present invention is not limited to the above embodiment. For example, the error diffusion process may partially or entirely be realized by a software using a computer program. For example, the function indicated by the flow chart of FIGS. 3 and 4 can be stored in a recording medium such as a ROM or a nonvolatile RAM in the form of a software program. By executing this program with a microcomputer, the process related to error diffusion can be realized.

Furthermore, when the above-described error diffusion process is to be executed by a software using a general computer such as a personal computer, the error diffusion process can be executed with the operating system of the personal computer and the application program together. In other words, the above-described error diffusion process may be partially carried out by the operating system.

A modification of the above-described embodiment will be enumerated hereinafter.

(1) Comparator 17 is not limited to the comparison of Th–I"$_{xy}$ and E'$_{x-y, y}$. I"$_{xy}$ can be compared with Th–E'$_{x-1, y}$, so that B$_{xy}$ is determined according to the following condition.

$B_{xy}=1$ $(I'_{xy} \geq Th-E'_{x-1, y})$ $B_{xy}=0$ $(I'_{xy} < Th-E'_{x-1, y})$ In this case, subtractor 23 to which threshold value Th is input is provided between adder 16 and adder 24.

(2) In the present embodiment, a process is carried out by first calculating weighted mean error Eave'$_{xy}$ excluding binarization error E'$_{x-1, y}$ of pixel data I$_{x-1, y}$ of the pixel selected as an immediately preceding target pixel (one previous pixel) with respect to target pixel data I$_{xy}$ and adding the calculated weighted mean error Eave'$_{xy}$ to I$_{xy}$.

Alternatively, a weighted mean error Eave"$_{xy}$ can be calculated excluding the binarization errors of two preceding pixel data, i.e., without 3binarization error E'$_{x-1,y}$ of pixel data I$_{x-1,y}$ of the immediately preceding pixel (one previous pixel) with respect to target pixel data I$_{xy}$, and without binarization error E'$_{x-2, y}$ of pixel data I$_{x-2, y}$ of the further previous pixel and add the calculated weighted mean error Eave"$_{xy}$ to I$_{xy}$. In this case, I$_{xy}$+E'ave$_{xy}$–Th is applied to port B and E'$_{x-1, y}$+E'$_{x-2, y}$ is applied to port A of comparator 17 of FIG. 2, which are compared to output B$_{xy}$. According to this structure, the amount of calculation to be processed in one pixel cycle becomes greater than the formerly disclosed embodiment due to calculation of E'$_{x-1, y}$+E'$_{x-2, y}$, resulting in delay in the process. However, the process can be carried out faster than that of the structure of FIG. 5. In this structure, weighted mean error is calculated with the binarization errors of I$_{x-1, y}$ and I$_{x-2, y}$ of two pixels preceding the current target pixel data I$_{xy}$ left out. The weighted mean error can be calculated with the binarization error of a pixel selected as a target pixel further previous to I$_{x-2, y}$ can also be left out. More specifically, by excluding at least the binarization error of I$_{x-1, y}$ to initiate the calculation of the weighted mean error to advance the process, the binarization process can be speeded. It is to be noted that, in order to further speed up the process, a structure of leaving out only binarization error E'$_{x-1, y}$ of pixel data I$_{x-1, y}$ shown in FIG. 2 is desirable. This is because the amount of calculation to be processed in one pixel cycle is minimum.

(3) An error weighting filter 22 of a matrix of 5×3 is taken as an example in the present embodiment. However, an error weighting filter of another matrix size, for example 3×2, can be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus which processes M gradation image data of a target pixel to obtain N gradation image data of the target pixel by using an error diffusion method, where N is less than M, said image processing apparatus comprising:

a first calculator for calculating a first error to be added to the M gradation image data of the target pixel from peripheral pixels of the target pixel, said peripheral pixels excluding a pixel which immediately precedes the target pixel; and an adder for adding the first error, which is calculated by said first calculator, to the M gradation image data of the target pixel.

2. An image processing apparatus which processes M gradation image data of a target pixel to obtain N gradation image data of the target pixel by using an error diffusion method, where N is less than M, said image processing apparatus comprising:

a first calculator for calculating a first error to be added to the M gradation image data of the target pixel from peripheral pixels of the target pixel, said peripheral pixels excluding a pixel which immediately precedes the target pixel;

an adder for adding the first error, which is calculated by said first calculator, to the M gradation image data of the target pixel;

a second calculator for calculating a second error based on N gradation image data of said pixel immediately preceding said target pixel; and a decreasing circuit which outputs the N gradation image data of the target pixel based on the second error and the added result obtained by said adder.

3. An image processing apparatus according to claim 2, wherein said decreasing circuit obtains the N gradation image data of the target pixel based on a predetermined threshold value.

4. An image processing apparatus according to claim 3, wherein said decreasing circuit executes the steps of:

(a) calculating a first difference between the threshold value and the added result, and (b) obtaining the N gradation image data of the target pixel by calculating a second difference between the first difference and the second error.

5. An image processing method for processing M gradation image data of a target pixel to obtain N gradation image data of the target pixel by using an error diffusion method, where N is less than M, said image processing method comprising the steps of:

(a) calculating a first error which is to be added to the M gradation image data of the target pixel from peripheral pixels of the target pixel, said peripheral pixels excluding a pixel which immediately precedes the target pixel; and (b) adding the first error to the M gradation image data of the target pixel.

6. An image processing method for processing M gradation image data of a target pixel to obtain N gradation image data of the target pixel by using an error diffusion method, where N is less than M, said image processing method comprising the steps of:

(a) calculating a first error which is to be added to the M gradation image data of the target pixel from peripheral pixels of the target pixel, said peripheral pixels excluding a pixel which immediately precedes the target pixel;

(b) adding the first error to the M gradation image data of the target pixel;

(c) calculating a second error based on N gradation image data of the pixel which is immediately preceding said target pixel; and (d) outputting the N gradation image data of the target pixel based on the second error and the added result obtained in step (b).

7. An image processing method according to claim 6, said step (d) comprising the steps of:
  (d-1) calculating a first difference between a predetermined threshold value and the added result obtained in said step (b), and
  (d-2) obtaining the N gradation image data of the target pixel by calculating a second difference between the first difference and the second error.

* * * * *

UNITED STATES PATENT AND TRADEMARK OFFICE
CERTIFICATE OF CORRECTION

PATENT NO. : 6,356,361 B1
DATED : March 12, 2002
INVENTOR(S) : Atsushi Ishikawa et al.

It is certified that error appears in the above-identified patent and that said Letters Patent is hereby corrected as shown below:

<u>Title page,</u>
ABSTRACT,
Line 8 delete "$E'_{x-1, y'}$", and insert -- $E'_{x-1, y}$ --.

<u>Column 5,</u>
Line 19, (Equation (7)), delete "$E'_{x-1, y} = 2/16 \ xX_{x-1, y}$", and insert -- $E'_{x-1, y} = 2/16 \ xE'_{x-1, y}$ --.
Line 44, (Equation (9)), delete "$E'_{x-1, y} \geqq Th\text{-}I'_{xy}$", and insert -- $E'_{x-1, y} \geq Th - I''_{xy}$ --.

Signed and Sealed this

Third Day of September, 2002

*Attest:*

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.    : 6,356,361 B1
DATED         : March 12, 2002
INVENTOR(S)   : Atsushi Ishikawa et al.

It is certified that error appears in the above-identified patent and that said Letters Patent is hereby corrected as shown below:

<u>Title page,</u>
ABSTRACT,
Line 8 delete "$E'_{x-1, y'}$", and insert -- $E'_{x-1, y}$ --.

<u>Column 5,</u>
Line 19, (Equation (7)), delete "$E'_{x-1, y}=2/16\ xX_{x-1,\ y}$", and insert -- $E'_{x-1, y} =2/16\ xE_{x-1, y}$ --.
Line 44, (Equation (9)), delete "$E'_{x-1, y} \geqq Th\text{-}I'_{xy}$", and insert -- $E'_{x-1, y} \geqq Th - I''_{xy}$ --.

This certificate supersedes Certificate of Correction issued September 3, 2002.

Signed and Sealed this

Twenty-fifth Day of May, 2004

JON W. DUDAS
*Acting Director of the United States Patent and Trademark Office*